(12) United States Patent
Huang et al.

(10) Patent No.: US 11,310,041 B2
(45) Date of Patent: Apr. 19, 2022

(54) METHOD AND APPARATUS FOR ACHIEVING FINE-GRAINED ACCESS CONTROL WITH DISCRETIONARY USER REVOCATION OVER CLOUD DATA

(71) Applicant: Arizona Board of Regents on Behalf of Arizona State University, Scottsdale, AZ (US)

(72) Inventors: Dijiang Huang, Chandler, AZ (US); Jim Luo, Alexandria, VA (US); Myong Hoon Kang, Fairfax, VA (US); Qiuxiang Dong, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/728,724

(22) Filed: Dec. 27, 2019

(65) Prior Publication Data

US 2020/0322142 A1 Oct. 8, 2020

Related U.S. Application Data

(60) Provisional application No. 62/830,197, filed on Apr. 5, 2019.

(51) Int. Cl.
*H04L 29/06* (2006.01)
*H04L 9/08* (2006.01)
(Continued)

(52) U.S. Cl.
CPC .......... *H04L 9/0861* (2013.01); *H04L 9/0825* (2013.01); *H04L 9/0891* (2013.01);
(Continued)

(58) Field of Classification Search
CPC ................. H04L 9/0861; H04L 9/0891; H04L 9/1097; H04L 9/3236; H04L 9/321; H04L 9/0825; H04L 63/10; H04W 12/082
See application file for complete search history.

(56) References Cited

U.S. PATENT DOCUMENTS

| | | | |
|---|---|---|---|
| 2006/0041751 A1* | 2/2006 | Rogers ................. | H04L 63/068 713/171 |
| 2014/0229736 A1* | 8/2014 | Asim .................... | H04L 9/0836 713/171 |

(Continued)

OTHER PUBLICATIONS

Akinyele, J.A., et al. "Charm: a framework for rapidly prototyping cryptosystems," Journal of Cryptographic Engineering, vol. 3, No. 2, 2013, pp. 111-128.

(Continued)

*Primary Examiner* — Thaddeus J Plecha
(74) *Attorney, Agent, or Firm* — Elliott, Ostrander & Preston, P.C.

(57) ABSTRACT

A method for a data owner to enforce attribute-based and discretionary access control over a cloud-based data store by specifying an access policy, creating a plurality of users with attributes that satisfy the access policy, and revoking one or more of the plurality of users by embedding their respective identities as revoked into a ciphertext, whereby only those of the plurality of users whose attributes satisfy the access policy and that are not revoked can decrypt the ciphertext.

14 Claims, 7 Drawing Sheets

(51) Int. Cl.
  H04L 67/1097 (2022.01)
  H04L 9/32 (2006.01)
(52) U.S. Cl.
  CPC ............ *H04L 9/321* (2013.01); *H04L 9/3236* (2013.01); *H04L 67/1097* (2013.01)

(56) References Cited

U.S. PATENT DOCUMENTS

| | | | | |
|---|---|---|---|---|
| 2016/0055347 | A1* | 2/2016 | Park | H04L 9/0825 713/165 |
| 2018/0025172 | A1* | 1/2018 | Mori | G06F 21/6218 713/193 |
| 2020/0186347 | A1* | 6/2020 | Dolev | H04N 21/2347 |
| 2020/0404023 | A1* | 12/2020 | Zhu | H04L 63/0807 |

OTHER PUBLICATIONS

Akinyele, J.A., et al. "Securing electronic medical records using attribute-based encryption on mobile devices," in Proceedings of the 1st ACM workshop on Security and privacy in smartphones and mobile devices, ACM, 2011, pp. 75-86, Springer, Berlin, Heidelberg.

Attrapadung, N., et al. "Conjunctive Broadcast and Attribute-Based Encryption," In: Shacham H., Waters B. (eds) Pairing-Based Cryptography—Pairing 2009, Pairing 2009, Lecture Notes in Computer Science, vol. 5671, 2009, pp. 248-265, Springer, Berlin, Heidelberg.

Bethencourt, J., et al. "Ciphertext-Policy Attribute-Based Encryption," IEEE Symposium on Security and Privacy (SP'07), 2007, pp. 321-334.

Dong Q., et al. "Fuzzy Keyword Search over Encrypted Data in the Public Key Setting, " In: Wang J., Xiong H., Ishikawa Y., Xu J., Zhou J. (eds) Web-Age Information Management. WAIM 2013. Lecture Notes in Computer Science, vol. 7923, 2013, pp. 729-740, Springer, Berlin, Heidelberg.

Dong, Q., et al. "Achieving Fine-Grained Access Control with Discretionary User Revocation over Cloud Data," 2018 IEEE Conference on Communications and Network Security (CNS), 2018, pp. 1-9.

Dong, Q., et al. "Privacy-Preserving Matchmaking in Geosocial Networks with Untrusted Servers," 2017 IEEE 37th International Conference on Distributed Computing Systems (ICDCS), 2017, pp. 2591-2592.

Dong, Q., et al. "Attribute-Based Keyword Search Efficiency Enhancement via an Online/Offline Approach." 2015 IEEE 21st International Conference on Parallel and Distributed Systems (ICPADS), 2015 pp. 298-305.

Fiat A., et al. "Broadcast Encryption," In: Stinson D.R. (eds) Advances in Cryptology—CRYPTO' 93, CRYPTO 1993, Lecture Notes in Computer Science, vol. 773, 1994, pp. 480-491, Springer, Berlin, Heidelberg.

Goyal, V., et al. "Attribute-based encryption for fine-grained access control of encrypted data," Proceedings of the 13th ACM conference on Computer and communications security, 2006, pp. 89-98, Association for Computing Machinery, New York, NY.

Hur, J., et al. "Attribute-Based Access Control with Efficient Revocation in Data Outsourcing Systems," IEEE Transactions on Parallel and Distributed Systems, vol. 22, No. 7, 2011, pp. 1214-1221.

Lai, J., et al. "Attribute-based encryption with verifiable outsourced decryption," IEEE Transactions on Information Forensics and Security, vol. 8, No. 8, 2013, pp. 1343-1354.

Lewko, A., et al. "Revocation systems with very small private keys," in Security and Privacy (SP), 2010 IEEE Symposium on Security and Privacy, 2010, pp. 273-285.

Li, B., et al. "Attribute-based access control for ICN naming scheme," in Communications and Network Security (CNS), 2014 IEEE Conference on Communications and Network Security, 2014, pp. 391-399.

Li, M., et al. "Scalable and secure sharing of personal health records in cloud computing using attribute-based encryption," IEEE transactions on parallel and distributed systems, vol. 24, No. 1, 2013, pp. 131-143.

Lynn, B., "The pairing-based cryptography library," retrieved from https://crypto.stanford.edu/pbc on Sep. 21, 2021, 2 pages.

Morstatter, F., et al. "A new approach to bot detection: striking the balance between precision and recall," 2016 IEEE/ACM International Conference on Advances in Social Networks Analysis and Mining (ASONAM), 2016, pp. 533-540.

Naor D., et al. "Revocation and Tracing Schemes for Stateless Receivers," In: Kilian J. (eds) Advances in Cryptology—CRYPTO 2001, CRYPTO 2001, Lecture Notes in Computer Science, vol. 2139, 2001, pp. 41-62, Springer, Berlin, Heidelberg.

Ostrovsky, R., et al. "Attribute-based encryption with non-monotonic access structures," in Proceedings of the 14th ACM conference on Computer and communications security, ACM, 2007, pp. 195-203.

Sampson, J., et al. "Leveraging The Implicit Structure Within Social Media For Emergent Rumor Detection," in Proceedings of the 25th ACM International on Conference on Information and Knowledge Management, ACM, 2016, pp. 2377-2382.

Turner, K. "Hacked Dropbox login data of 68 million users is now for sale on the dark Web," The Washington Post, retrieved from https://www.washingtonpost.com/news/the-switch/wp/2016/09/07/hacked-dropbox-data-of-68-million-users-is-now-or-sale-on-the-dark-web/ on Oct. 1, 2021, 2 pages.

Waters , B., et al. "Ciphertext-Policy Attribute-Based Encryption: An Expressive, Efficient, and Provably Secure Realization," In: Catalano D., Fazio N., Gennaro R., Nicolosi A. (eds) Public Key Cryptography—PKC 2011, PKC 2011, Lecture Notes in Computer Science, vol. 6571, 2011, 30 pages, Springer, Berlin, Heidelberg.

Waters , B., et al. "Ciphertext-Policy Attribute-Based Encryption: An Expressive, Efficient, and Provably Secure Realization," In: Catalano D., Fazio N., Gennaro R., Nicolosi A. (eds) Public Key Cryptography—PKC 2011, PKC 2011, Lecture Notes in Computer Science, vol. 6571, 2011, 18 pages, Springer, Berlin, Heidelberg.

Wu, L., et al. "Mining misinformation in social media," Big Data in Complex and Social Networks, 2016, pp. 123-152.

Wu, L., et al. "Toward relational learning with misinformation." SIAM International Conference on Data Mining, 2018, 9 pages.

Wu, L., et al. "Tracing fake-news footprints: Characterizing social media messages by how they propagate," WSDM '18: Proceedings of the Eleventh ACM International Conference on Web Search and Data Mining, Feb. 2018, pp. 637-645.

Wu,L., et al. "Adaptive spammer detection with sparse group modeling." Proceedings of the International AAAI Conference on Web and Social Media, 11(1), 2017, pp. 319-326.

Yamada S., et al. A Framework and Compact Constructions for Non-monotonic Attribute-Based Encryption. In Krawczyk H. (eds) Public-Key Cryptography—PKC 2014, PKC 2014, Lecture Notes in Computer Science, vol. 8383, 2014, pp. 275-292.

Yang, K., et al. "Attribute-based fine-grained access control with efficient revocation in cloud storage systems," in Proceedings of the 8th ACM SIGSAC symposium on Information, computerand communications security, ACM, 2013, pp. 523-528.

Yu, S., et al. "Achieving Secure, Scalable, and Fine-grained Data Access Control in Cloud Computing," 2010 Proceedings IEEE INFOCOM, 2010, pp. 1-9.

Yu, S., et al. "Attribute-based content distribution with hidden policy," 2008 4th Workshop on Secure Network Protocols, IEEE, 2008, pp. 39-44.

Yu, S., et al. "Attribute-based on-demand multicast group setup with membership anonymity," Computer Networks, vol. 54, No. 3, 2010, pp. 377-386.

\* cited by examiner

METHOD AND APPARATUS FOR ACHIEVING FINE-GRAINED ACCESS CONTROL WITH DISCRETIONARY USER REVOCATION OVER CLOUD DATA

CROSS-REFERENCE TO RELATED APPLICATIONS

This U.S. Utility Patent Application is related to, and claims priority to, the U.S. provisional patent application No. 62/830,197, filed Apr. 5, 2019, entitled "METHOD AND APPARATUS FOR ACHIEVING FINE-GRAINED ACCESS CONTROL WITH DISCRETIONARY USER REVOCATION OVER CLOUD DATA," the entire contents of which are incorporated herein by reference.

STATEMENT REGARDING FEDERALLY SPONSORED RESEARCH

This invention was made with government support under grant N00173-15-1-G017 awarded by the Office of Naval Research. The government has certain rights in the invention.

TECHNICAL FIELD

Embodiments of the invention relate to cloud storage services, and in particular to a method and apparatus for restricting access control to data in cloud storage from one or more individual, or affiliated, users.

BACKGROUND

Compared with traditional computation/storage methods, cloud computing offers superior flexibility, accessibility, and capacity. As a result, it is quickly becoming a mainstay in more and more companies. Storage services, e.g., Microsoft's Azure, Amazon's S3 and Google Cloud, are a fundamental component of cloud computing, which allows consumers to outsource their data to remote cloud servers. Outsourcing data management to the cloud provides to the consumers both economic benefits and ease-of-use. However, cloud storage service consumers and cloud storage service providers are in different trust domains, therefore the consumers are concerned about unauthorized data access. Both malicious insiders, such as administrators, and outside attackers, such as hackers, have, or are able to gain full access to the cloud servers and consequently access the consumers' data. Frequent news accounts of cloud data intrusions in recent years have raised both service consumer and provider concerns regarding the privacy of cloud-stored data and pushed the development of using cryptographic approaches to enforce access control in cloud storage services.

In cryptography, a key is a piece of information (a parameter) that determines the functional output of a cryptographic algorithm. For encryption algorithms, a key specifies the transformation of plaintext into encrypted text, i.e., ciphertext, and vice versa for decryption algorithms.

Public-key encryption, or public-key cryptography, or asymmetric cryptography, is a cryptographic system that uses pairs of keys: public keys which may be disseminated widely, and private keys which are known only to the owner. The generation of such keys depends on cryptographic algorithms based on mathematical problems to produce one-way functions. Effective security only requires keeping the private key private; the public key can be openly distributed without compromising security. In such a system, any person can encrypt a message using the receiver's public key, but that encrypted message can only be decrypted with the receiver's private key.

Attribute-based encryption (ABE) is a type of public-key encryption in which the secret key of a user and the ciphertext are dependent upon attributes (e.g., a time attribute, a geographic attribute, such as the country in which the user lives, or a subscription type attribute, i.e., the kind of subscription the user has) and access control policies respectively. In such a system, the decryption of a ciphertext is possible only if the set of attributes of the user key matches the access control policy associated with the ciphertext.

There are two types of attribute-based encryption schemes: key-policy attribute-based encryption (KP-ABE) and ciphertext-policy attribute-based encryption (CP-ABE). ABE systems suffer from the drawback of no user revocation mechanism.

User revocation is challenging in attribute-based encryption systems, given that each attribute possibly belongs to multiple different users, revoking users by way of attribute revocation is not practical, whereas in traditional public key infrastructure (PKI) systems, public/private key pairs are uniquely associated with a single user. The problem is how to revoke a single user when that user shares attributes with other users.

Ciphertext Policy Attribute-Based Encryption (CP-ABE) is regarded as one of the most promising approaches to enforce access control in cloud storage services. In CP-ABE, each data user (defined to be a system user who requests access to data, and so is a data requester) is given a set of attributes, which are embedded into private keys by a trusted authority (TA). A data owner (defined to be a system user who provides data to data users, and so is data provider) enforces an access policy over the data directly by encrypting it with an access structure using attribute public keys. A data user can thereafter access the data using the corresponding attribute private key provided by the TA. Instead of access control being performed by the cloud server, access control is done "inside the cryptography", where only data users with eligible attributes (i.e., satisfying the access policy) could decrypt the ciphertext. The ciphertext size is not related to the number of data users and no interactions among data owners and data users are needed. Moreover, CP-ABE is resistant against collusion attacks. All these properties make CP-ABE a good fit for fine-grained access control in cloud computing where the storage server cannot be fully trusted. As with most public key schemes, revocation is a difficult problem since, as mentioned above, there is no effective user revocation mechanism. Multiple users usually share common attributes, which makes it easier to specify the recipients for granting access, but makes user management, especially individual user revocation harder when applying CP-ABE schemes in practice.

Previous research defines the user revocation problem as attribute-based revocation. Whenever a user revocation occurs, the TA generates new secret information for non-revoked users to update their private key. Although attribute-based revocation is a possible solution to the user revocation problem, it suffers the following deficiencies:
1) The TA has to be online all the time to deal with each user revocation, which makes it a potential single point of failure;
2) Generation and distribution of new keys leads to additional computation and communication overhead which will be very high when there are a great number of affected non-revoked users and/or user revocation happens frequently. Both scenarios are inevitable in real-world applications;

3) Revocation of a user's attributes takes effect globally and irreversibly. This is suitable for revoking leaked private keys. There are other situations where data owners might need the discretion to revoke certain users.

DETAILED DESCRIPTION

I. Introduction

Figure 1:
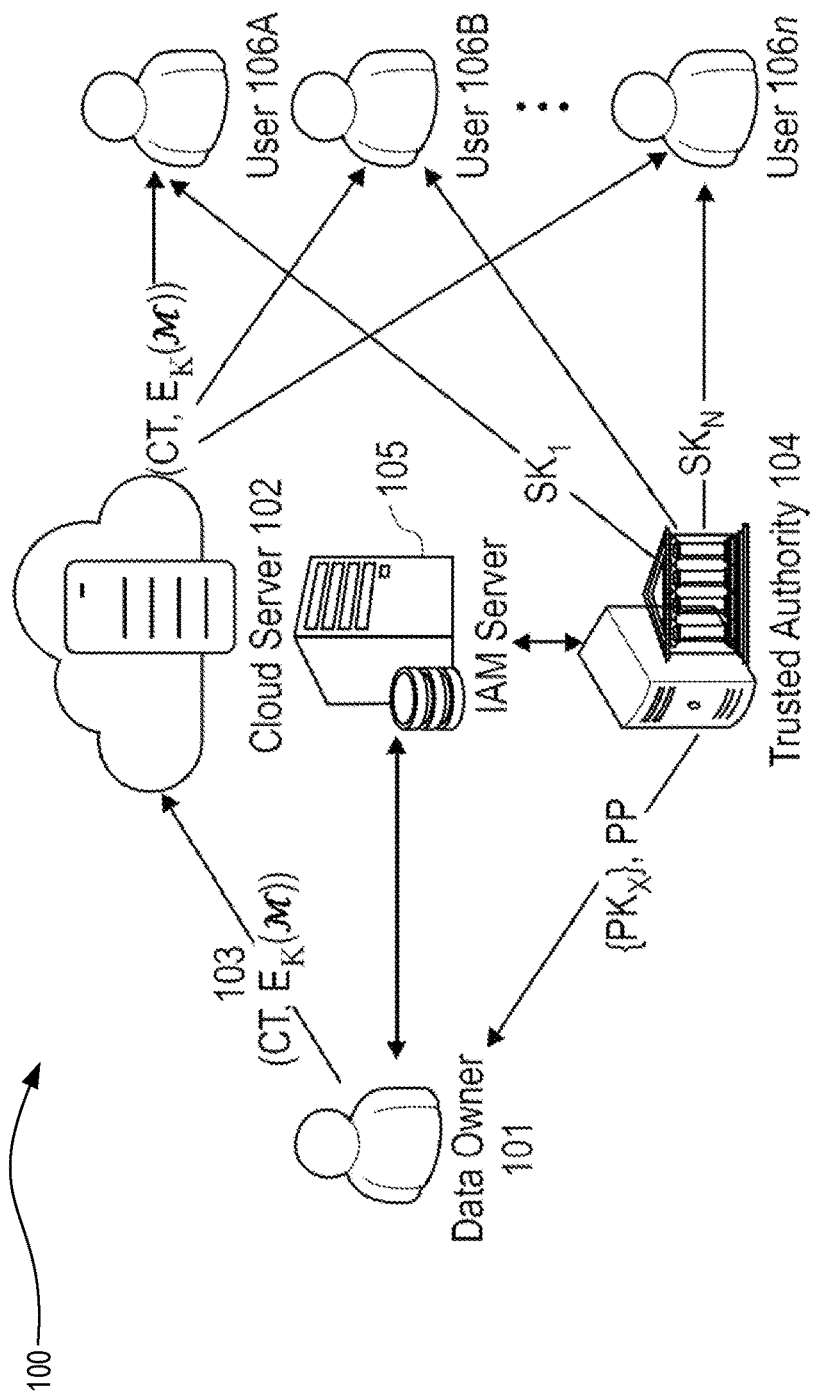
FIG. 1 depicts a system model of an access control system in accordance with embodiments of the invention.

Cloud storage solutions have gained momentum in recent years. However, cloud servers cannot be fully trusted. Data access control have become one of the main impediments for further adoption. One appealing approach is to incorporate the access control into encrypted data, thus removing the need to trust the cloud servers. Among existing cryptographic solutions, Ciphertext Policy Attribute-Based Encryption (CP-ABE) is well suited for fine-grained data access control in cloud storage. As promising as it is, user revocation is a cumbersome problem that impedes its wide application. To address this issue, embodiments of the invention provide an access control system referred to herein as DUR-CP-ABE, which implements identity-based User Revocation in a data owner Discretionary way. Embodiments include the following salient features:

1. User revocation enforcement is based on the discretion of the data owner, thus providing more flexibility.
2. No private key updates are needed when user revocation occurs.
3. Group revocation of affiliated users may be performed in a batch operation. To the best of Applicant's knowledge, DUR-CP-ABE is the first CP-ABE solution to provide affiliation-based batch revocation functionality, which fits well into organizations' Identity and Access Management (IAM) structure.

Analysis shows that an access control system in accordance with embodiments of the invention is provably secure and efficient in terms of computation, communication and storage.

Embodiments of the invention, referred to herein as DUR-CP-ABE, differ from prior-art attribute-based approaches. Embodiments of the invention support identity-based revocation in a discretionary manner for the data owner. Both users' attributes and identity are embedded into the private key. The data owner can enforce both attribute-based and discretionary access control over the cloud-stored data according to the following encryption procedure, which may also be referred to as an authorized group construction procedure:

1) Specify an access policy to build a group of candidate authorized users;
2) Revoke undesired users by embedding their identities as revoked into the ciphertext.

Access policy is defined by the data owner. As an example, assume that the system provides the following attributes: Arizon State University, student, research assistant. An example access policy could be as follows: "ASU" and "student" and "research assistant". Thus, only users who are assigned all the three attributes could decrypt the data. This access policy implicitly defines a group of users. Users who are only assigned the attributes "ASU" and "student" are excluded from the authorized users. Undesired users are selected by data owners. A data owner might have a blacklist, for example.

In this manner, only users whose attributes satisfy the access policy and whose identities are not revoked by the data owners could decrypt the ciphertext. The user revocation is enforced on the data owner's end and incorporated in the ciphertext without interactions with the TA or affecting non-revoked users. Furthermore, it takes identity management directory into consideration and makes it practical and efficient to revoke multiple affiliated users at once according to the organization or identity management hierarchy.

According to embodiments, the data owner may call the service provided by an Identity and Access Management (IAM) system to search a data user's identity. In the system, the identity might be some nonsense numerical values that the data owners cannot remember. The data owner might provide the username or some title information, and the IAM works as a search engine to provide the corresponding hierarchical identity. Another function of the IAM is to enable the data owners to revoke as few identities as possible since the encryption and decryption overhead is proportional to the number of revoked identities. The data owner can provide a list of user identities to the IAM system. The IAM system can search its hierarchical identity management system to check whether some of the users are affiliated with a department or division so that the data owner could just revoke the department's identity.

Some of the benefits and features of embodiments of the invention are as follows:

an ABE-based access control framework that fits well into an organizations' IAM structure;

supports discretionary revocation of both individual users, and affiliated users in a batch process;

resistant against attacks in a cloud storage environment; and a practical approach for practical applications, shown in the performance evaluation described below.

II. Preliminaries and Identity Structure

A. Preliminaries

Bilinear Map Let $\mathbb{G}_1$, $\mathbb{G}_2$, and $\mathbb{G}_T$ be multiplicative cyclic groups of prime order p. Let $g_1$ and $g_2$ be the generator of $\mathbb{G}_1$ and $\mathbb{G}_2$ respectively. A bilinear map is a map e: $\mathbb{G}_1 \times \mathbb{G}_2 \rightarrow \mathbb{G}_T$ with the following properties:

Computable: there exists and efficiently computable algorithm for computing e;

Bilinear: for all $u \in \mathbb{G}_1$, $v \in \mathbb{G}_2$ and a, $b \in \mathbb{Z}_p$, $e(u^a, v^b) = e(u,v)^{ab}$; For any $u \in \mathbb{G}_1$, $v_1, v_2 \in \mathbb{G}_2$, $e(u, v_1 v_2) = e(u, v_1) \cdot e(u, v_2)$;

Non-degenerate: $e(g_1, g_2) \neq 1$.

The bilinear map is called symmetric, if $\mathbb{G}_1 = \mathbb{G}_2 = \mathbb{G}$.

M-q-parallel-BDHE The definition of the modified (decisional) q parallel Bilinear Diffie-Hellman Exponent problem is as follows. Choose a group $\mathbb{G}$ of prime order q, a random generator g of $\mathbb{G}$ and random a, s, $b_1, b_2, \ldots, b_q \in \mathbb{Z}_p$. Given $$y = \{g, g^s, g^a, \ldots, g^{(a^q)}, g^{(a^{q+2})}, \ldots, g^{a^{2q}}\},$$

$$\forall_{1 \leq i \leq q} g^{a/b_i}, \ldots, g^{a^q/b_i}, g^{a^{q+2}/b_i}, \ldots, g^{a^{2q}/b_i},$$

$$\forall_{1 \leq j \leq q} g^{a \cdot s/b_j}, \ldots, g^{a^q \cdot s/b_j}\}_1$$

it is hard for a probabilistic polynomial time (PPT) adversary to distinguish $e(g, g)^{a^{q+1}s} \in \mathbb{G}_T$ from a random element R chosen from $\mathbb{G}_T$. An algorithm $\mathcal{B}$ that outputs $z \in \{0,1\}$ has advantage $\in$ in solving the M-q-parallel-BDHE problem defined as above if the following equation holds.

$$|Pr[\mathcal{B}(y, T = e(g,g)^{a^{q+1}s}) = 0] - Pr[\mathcal{B}(y, T = R) = 0]| \geq \in.$$

The M-q-parallel-BDHE assumption holds if the advantage $\in$ of any PPT adversary $\mathcal{B}$ to solve the M-q-parallel-BDHE problem is a negligible function of the security parameter.

Theorem 1. The Modified (decisional) q parallel Bilinear Diffie-Hellman Exponent assumption generically holds.

A security proof of Theorem 1 follows. Using the terminology from BBG, this proof shows that $f = a^{q+1}s$ is independent of the polynomials P and Q. $Q = \{1\}$ since all given terms are in the bilinear group and $$P = \{1, s, \forall_{i \in [1, 2a], j \in [1, q], i \neq q} + 1 a^i, a^s/b_j, a^i \cdot s/b_j\}.$$

Choose a generator u. Set $g = u^{\Pi_{j \in [1, q]} b_j}$. All the above terms are substituted by a set of polynomials with the maximum degree 3q+1. Now, check whether f is symbolically independent of any two polynomials in P and Q. To realize f from P and Q, a term of the form $a^{m+1}s$ is needed. Whereas, no such terms can be realized from the product of any two polynomials p, $p' \in P$. To form such a term, a polynomial with a single factor of s is needed. If s is used as p, then p' has to be $a^{q+1}$ which doesn't exist in P. If $p = a^i \cdot s/b_j$, there always exists $b_j$, which cannot be canceled. Hence it can be concluded that the M-q-parallel-BDHE assumption is generically secure.

B. Identity Structure with Directory Schema

Most organizations have some type of Identity and Access Management (IAM) directory that contains information that pertains to the organization's users. The information of each user is configured and managed through a directory service. The most commonly used directory service is a database directory based on the X.500 standard where a tree structure is used to organize the entries using a parent-child configuration. Leaf nodes represent individual users. Non-leaf nodes represent domain components of an organization, among which the root node plays the role of the TA which is the trust root of the whole organization. Each domain component and individual user has a unique name under the parent domain component, which is called local identity (LID), as well as a unique global identity (denoted by ID) within the organization. Assume that the height of the directory tree is H+1. The root node is on the $0^{th}$ layer, the identities of the domain components and users can be constructed with the following syntax:

0-ID:=ID of the trusted authority, $i$-ID:=parent$(i-1)$-ID$\|i$-LID,$(1 \leq i \leq H)$ For example, a root node "dc=.LocalSecurity" is the trusted authority with several subordinate domain components, e.g., "dc=.R&D". "E.g. Name" is a user working in a $4^{th}$ layer domain component "dc=.USA", with a unique identity ID="dc=.LocalSecurity"$\|$"dc=.Sales"$\|$"dc=.International"$\|$"dc.=USA"$\|$"cn=.E.g. Name". For an individual user on the $i^{th}$ layer $(1 \leq i \leq H)$, the following definition applies:

$ID_{i_h}$:=ancestor $h$-ID, where $h \in [0, i-1]$ and "ancestor h-ID" denotes the global identity of the ancestor node on the $h^{th}$ layer of the path from the root node to the user node. For the individual user "E.g. Name", $ID_{i_1}$="dc=.LocalSecurity"$\|$"dc=.Sales"; $ID_{i_2}$="dc=.LocalSecurity"$\|$"dc=.Sales"$\|$"dc=.International".

III. System And Security Models

A. System Model

FIG. 1 presents the system model of an access control system in accordance with embodiments of the invention 100. The Data Owner 101 encrypts the data under one or more access policies and set of revoked identities before outsourcing them to the Cloud Server 102. A hybrid encryption approach is adopted. The ABE scheme is used to encrypt a data encrypting key (DEK), and then the data is encrypted by the DEK with a symmetric encryption scheme. In FIG. 1, the DEK is the symmetric encryption key K. The Data Owner uploads at 103 the ABE ciphertext of K and the symmetric encryption ciphertext of the data M. In application scenarios where the data size is large, the Data Owner may divide the data into several blocks/components according to the logic granularities and then encrypt each block with symmetric encryption key(s).

The Trusted Authority (TA) 104 is the root node in the organizational structure. It is the root of trust in the whole organization and is responsible for entitling attributes, identities, initializing the access control system, and assigning private keys to Users.

The IAM server 105 stores the organization's directory and provides directory services to both the Data Owner 101 and the TA 104. During encryption, the Data Owner searches the undesired users' full structural identities. The IAM 105 may also provide the service of finding whether and how to implement affiliated revocation to the Data Owner. Whenever a new user joins the organization, the TA 104 asks for the information about the user from the IAM server 105 and based on the obtained attributes and identity information, generates the secret key.

The Cloud Server 102 provides the data storage service to the Data Owner 101 and the data access service to Users 106A, 106B, through 106n. Instead of engaging the Cloud Server 102 in the data access control, the access checking is done "inside the cryptography" according to embodiments of the invention.

The Data User, e.g., user 106A, is ascribed by an attribute set and a unique identity according to its role or identity in the directory. The User can decrypt the ciphertext only when it has eligible attributes and is not in the revoked set associated with the ciphertext.

B. Framework

Figure 9:
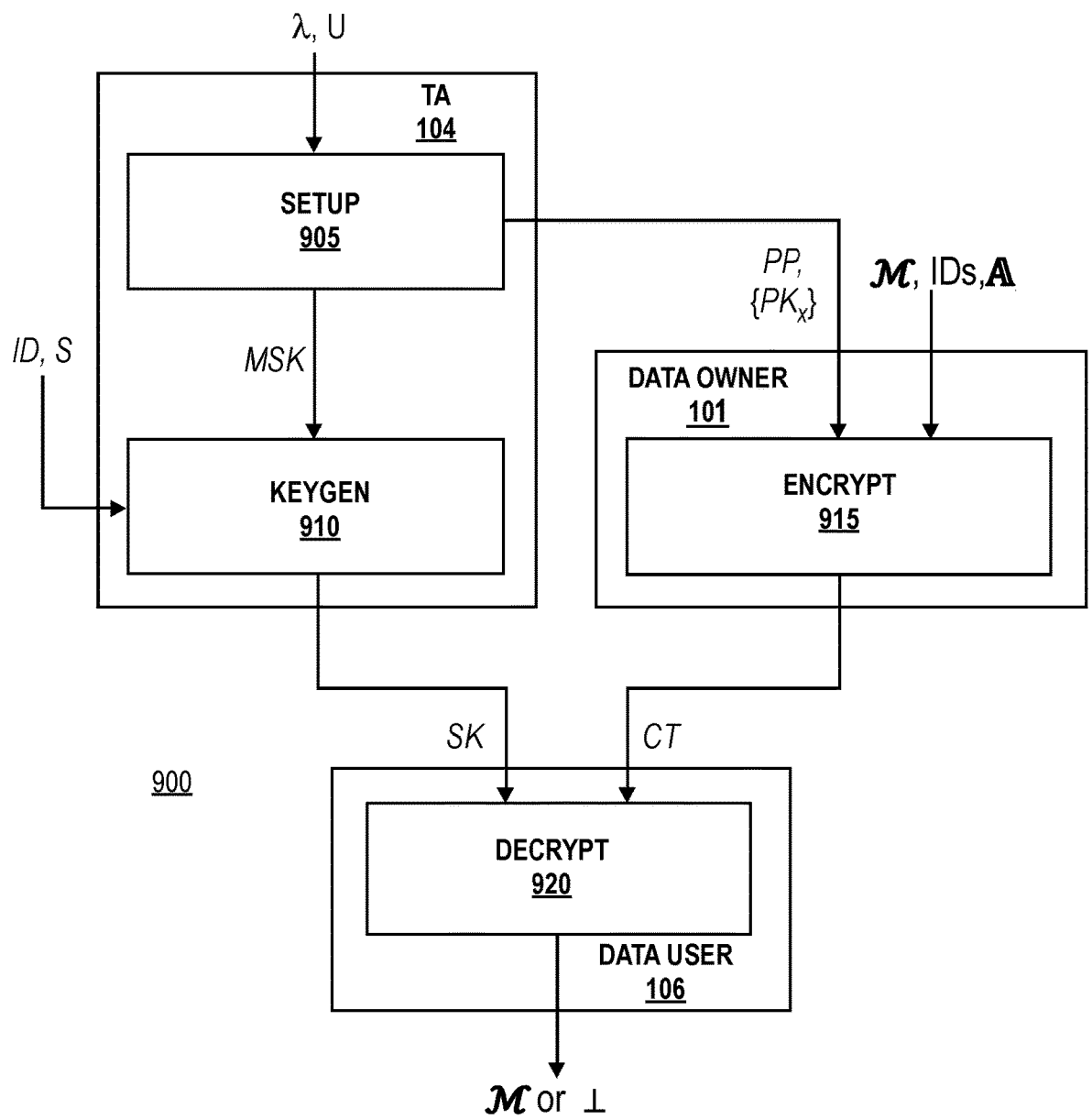
FIG. 9 provides a block diagram of a framework of embodiments of the invention, referred to herein as DUR-CP-ABE, consisting of the Setup, KeyGen, Encrypt, and Decrypt algorithms, as discussed further below.

With reference to FIG. 9, the framework 900 of embodiments of the invention, referred to herein as DUR-CP-ABE, consists of the following algorithms: Setup 905, KeyGen 910, Encrypt 915 and Decrypt 920, where Encrypt 915 is used for enforcing access policy and revoking undesired users based on the discretion of the data owner.

Setup $(\lambda, U) \rightarrow (MSK, PP, \{PK_x\})$: The setup algorithm 905 is run by the TA 104. It takes as inputs the security parameter $\lambda$ and the attribute universe U and outputs master secret key MSK to KeyGen 910, and public parameters PP, and the set of attribute-related public keys $\{PK_x\}$, to Data Owner 101.

KeyGen (MSK, ID, S)→SK: The key generation (KeyGen) algorithm 910 is run by the TA 104 as well. The inputs of the algorithm are the master secret key MSK received from Setup 905, a user's hierarchically structured identity ID, and a set of attributes S that describe the user's access privilege. The KeyGen algorithm 910 outputs the secret key SK for the user.

Encrypt (PP,$\{PK_x\}$, $\mathcal{M}$, IDs, $\mathbb{A}$)→CT: The data encryption algorithm 915 is run by the data owner 101. It takes as inputs the public parameters PP and the public attribute keys $\{PK_x\}$ output by Setup algorithm 905, and further takes as inputs a message $\mathcal{M}$, the set IDs of revoked identities and the access structure $\mathbb{A}$, and outputs a ciphertext CT. The revoked identity in the set IDs could be an identity of either an individual user or a subordinate organization in the organizational structure.

Decrypt (CT, SK)→$\mathcal{M}$ or ⊥: The data decryption algorithm 920 is run by the data user 106. It takes as inputs the ciphertext CT output by Encrypt algorithm 915 and the private key SK output by KeyGen algorithm 910. CT is associated with an access policy $\mathbb{A}$ and a set of revoked identities denoted by IDs. Decrypt 920 outputs the message $\mathcal{M}$ if the attributes associate with the secret key holder satisfy $\mathbb{A}$ and ID∈IDs.

Consistency Constraint: Given that SK is the private key generated by KeyGen when it takes inputs of an identity ID and an attribute set S; CT is the ciphertext generated by Encrypt when it takes inputs of a revoked identity set IDs and an access structure $\mathbb{A}$. Embodiments satisfy the following consistency constraint:

$$\forall \mathcal{M}: \text{Decrypt}(CT, SK) = \mathcal{M}, \text{ if } ID \notin IDs \text{ and } S \in \mathbb{A}$$

AND $$\text{Decrypt}(CT, SK) = \perp \text{ if } ID \in IDs \text{ or } S \notin \mathbb{A}.$$

Therefore, only the user whose attribute set S satisfies the access structure $\mathbb{A}$ and is not revoked can decrypt the ciphertext. S∉$\mathbb{A}$ denotes attribute set S does not satisfy the access structure $\mathbb{A}$. ID∈IDs means the user's ID is not in IDs and meanwhile the user is not under the administration of a domain component whose ID is included in IDs. The embodiments support not only individual user revocation but also affiliation-based revocation. Take an organizational structure mentioned above as an example: if "dc=.LocalSecurity"||"dc=.Sales"||"dc=.International"||"dc=.USA"||"cn=.Shon Harris"∉IDs, the individual data user "E.g. Name" is revoked by the data owner; if the identity "dc=.LocalSecurity"||"dc=.Sales"||"dc=.International"∉ IDs, i.e., the domain component "dc=.LocalSecurity"||"dc=.Sales"||"dc=.International" is revoked by the data owner, then all the data users in this domain component will be revoked.

C. Thread Model

Embodiments of the invention make the following thread assumptions of the cloud storage system in FIG. 1. First, the Cloud Server 102 follows the designated protocol to provide data storage and access services, but curiously infers sensitive information based on the data available to it by sniffering. Active attacks such as deleting or tampering with the stored data are outside the scope of embodiments of the invention. Second, the Cloud Server 102 might provide data access permission to unauthorized Users either on purpose for more economic benefits or because of data leakage events such as being hacked by malicious outsiders. Third, the Users are dishonest and may collude together in order to gain access privileges that they individually do not have. There are three categories of collusion:

1) attribute collusion, e.g., two non-revoked users A and B with attribute set $S_A=\{A_1, A_2\}$ and $S_B=\{A_3, A_4\}$ might collude in order to decrypt a ciphertext associated to an access policy $A_1$ & $A_4$;

2) a revoked user A with eligible attributes and a non-revoked user B whose attributes do not satisfy the access structure might collude together to try to gain data access privileges; and 3) two revoked users A and B both of whose attributes satisfy the access structure might collude together to gain unauthorized data access.

D. Security Model

The security model according to embodiments of the invention is described by a game between a challenger and an adversary $\mathcal{A}$ as follows.

Init: The adversary $\mathcal{A}$ commits to a challenge access structure $\mathcal{A}^*$ and a revoked identity set IDs* and sends them to the challenger.

Setup: The challenger runs the Setup algorithm. The generated master secret key MSK is kept secret and the public parameters PP and the set of public attributes key $\{PK_x\}$ are given to the adversary.

Phase1: The adversary $\mathcal{A}$ makes repeated private key queries $(S_i, ID_i)_{i\in[1,q^1]}$ with two constrains: (1) if $S_i\in \mathcal{A}^*$, then $ID_i\in IDs^*$; (2) if $ID_i\notin IDs^*$, then $S_i\notin \mathcal{A}^*$.

Challenge: The adversary sends to the challenger two randomly selected equal length messages $\mathcal{M}_0$ and $\mathcal{M}_1$. The challenger picks up a random bit b∈{0,1}, and encrypts $\mathcal{M}_b$ under the access structure $\mathbb{A}^*$ and the revoked identity IDs*. The generated challenge ciphertext CT* is sent back to the adversary $\mathcal{A}$.

Phase2: Repeat Phase1 with the same constrains.

Guess: The adversary outputs a guess bit b' of b.

Definition 1. Define $Adv_\mathcal{A} = |Pr[b'=b] - \frac{1}{2}|$ as the advantage of the adversary $\mathcal{A}$ winning the game above. Embodiments of the invention are secure if $Adv_\mathcal{A}$ of any PPT adversary $\mathcal{A}$ is a negligible function of the security parameter.

IV. Attribute-Based Access Control with Discretionary Revocation

An overview of the revocation technique according to embodiments of the invention is first described and then a construction of the fine-grained access control scheme through conjunctively adding the revocation technique to a CP-ABE scheme according to embodiments is described as follows.

A. Revocation Method Overview

The redundant equations first proposed to construct broadcast encryption schemes is utilized to implement the revocation according to embodiments of the invention. The encryption algorithm defines several "local" revocation equations. During decryption, a "two equation" method is used. Intuitively, when decrypting, a user ID will apply its secret key to the ciphertext. If ID∉IDs, it will get two independent equations and be able to extract the randomness used to mask the message; otherwise, the user will only get two dependent equations of a two variable formula and thus be unable to extract the randomness.

B. Access Control System Construction

Let $\mathbb{G}$ be a bilinear group of prime order p, and let g be the generator of $\mathbb{G}$. All the string-format identities can be encoded as an element in $\mathbb{Z}_p$ through a hash function $\{0,1\}^* \to \mathbb{Z}_p$. The access control system, according to embodiments, consists of the following four components.

Setting Up the System: The TA initializes the system, according to the embodiments, by running the Setup algorithm. In particular, it chooses random exponents $\alpha, b \in \mathbb{Z}_p$ as the master secret key MSK=$\{\alpha, b\}$. Then it generates the public parameters as follows.

$$PP = (g, g^b, g^{b^2}, e(g,g)^\alpha)$$

For each attribute x∈U, the TA generates a random group element $h_{xh} \in \mathbb{G}$ for each layer of the organizational trees structure. The following public attribute keys $PK_x$ are generated.

$$PK_x = \{h_{xh}^b\}_{h \in [1,H]}$$

Generating Secret Keys for Users: When a new user joins the system, it will be assigned a set of attributes based on its role or identity by the TA. Based on the assigned attributes and identity in the organizational structure, the TA then generates secret keys for the user by running the KeyGen algorithm. It takes as inputs the master secret key MSK the set of attributes S that describes the user's ID. Assume the user's ID is on the $H'^{th}$ layer (1≤H'≤H). It chooses a random $t \in \mathbb{Z}_p$ and generates the user's secret key in the following format and sends it to the user in a secure way.

$$SK = (K = g^\alpha g^{b^2 t}, K_x, L = g^{-t}), \text{ where}$$

$$K_x = \{K_{xh} = (g^{b \cdot ID|h} h_{xh})^t\}_{\forall x \in S, h \in [1,H], ID = ID(h \in |H', H|)}$$

Encrypting Data: The data owner processes the data to be outsourced with a hybrid encryption method as described in the system model. The Encrypt algorithm works as follows. It takes as inputs the public parameters PP, the set of public attribute keys $\{PK_x\}$, a data encryption key $\mathcal{K}$, an access policy $\mathbb{A}$ that can be denoted by an LSSS access structure (M, ρ) and the revoked identity set IDs=$\{ID_1, \ldots, ID_r\}$ constructed by querying the IAM server or on its own. M is an $\ell \times n$ n share-generating matrix where $\ell$ and n is decided by the complexity of the access policy. ρ is a function associates rows of M to attributes. $ID_j$ (j∈[1,r]) is on the $H_j^{th}$ layer in the organizational structure. If $ID_j$ is a domain component's identity, all the users under its administration will be revoked; otherwise, only an individual user will be revoked.

It chooses a random vector v=(s, $y_2, \ldots, y_n$) $\in \mathbb{Z}_p^n$ and for k∈[1, l] calculates $\lambda_k = v \cdot M_k$ where $M_k$ denotes the vector corresponding to the k-th row in the matrix M. It chooses random $\mu_1, \ldots, \mu_r \in \mathbb{Z}_p$ such that $\mu = \mu_1 + \ldots + \mu_r$. The ciphertext of the message K in the following format is uploaded onto the cloud server by the data owner.

$$CT = (C, C', \hat{C}, (M, \rho), IDs), \text{ where}$$

$$C = \mathcal{K} e(g,g)^{\alpha s \mu}, C' = g^{s\mu},$$

$$\hat{C} = \{\hat{C}_{k,j} = g^{b \cdot \lambda_k \mu_j}, \hat{C'}_{h,j}{}^u = (g^{b^2 \cdot ID_j} h_{\rho(k)H_2}{}^b)^{\lambda_k \mu_j}\}_{k \in [1,l]}{}^{j \in [1,r]}$$

Decrypting Data: The data user firstly downloads the encrypted data from the cloud server and then runs the Decrypt algorithm of the ABE scheme to obtain the data encryption keys and decrypts the data blocks with these DEKs. The Decrypt algorithm works as follows. It takes as inputs CT, which is the input ciphertext with an access structure (M, ρ) and a revoked identity $ID_j$ and secret key SK for a set of attributes S and the identity ID. Suppose that S satisfies the access structure and let I⊂[1, l] be defined as I=$\{i: \rho(i) \in S\}$. Let $\{\omega_i \in \mathbb{Z}_p\}_{i \in I}$ be a set of constants such that if $\{\lambda_i\}_{i \in I}$ are valid shares of any secret s according to M, then $\{\Sigma_{i \in I}\omega_i\lambda_i = s$. If the condition ID∉IDs holds, calculate A as follows. Obtain the value $e(g, g)^{\alpha s \mu}$ by evaluating $$\frac{e(C', K)}{A}.$$

The decryption algorithm then divides out this value from the ciphertext component C and obtains the message K.

$$A = \prod_{j=1}^{r} \prod_{i \in I} \left[ e(K_{\rho(i)H_j}, \hat{C}_{k,j}) \cdot e(L, \hat{C'}_{k,j}) \right]^{\frac{w_i}{ID|H_j - ID_j}}$$

For a revocation set IDs=$\{ID_1, \ldots, ID_r\}$, Encrypt creates an exponent $\mu \in \mathbb{Z}_p$ and splits it into r random shares $\mu_1, \ldots, \mu_r$. For each share, the ciphertext has two components $\hat{C}_{k,j}$ and $\hat{C'}_{k,j}$. If $ID_{|H_j} = ID_j$, it will get two linearly dependent equations and the exponent $b^2 t \lambda_k \mu_j$ $(ID_{|H_j} - ID_j)$ will be 0, thus unable to solve the system; otherwise it gets $e(g, g)^{b^2 s t \mu}$. If $ID_j$ is a domain component's identity, then the component $K_{xH_j}$ in the user secret key will not work, thus achieving affiliated revocation.

$$A = \prod_{j=1}^{r}\left(\prod_{i\in I}\left[e\left(\left(g^{b\cdot ID}|H_j h_{\rho(i)H_j}\right)^t, g^{b\lambda_t \mu_j}\right)\cdot\right.\right.$$
$$\left.\left. e\left(g^{-t}, \left(g^{b2\cdot ID'_j} h^b_{\rho(i)H_j}\right)^{\lambda_t\mu_j}\right)^{\overline{ID}|H_j - ID_j}\right]^{\frac{w_i}{|H_j| - ID_j}}\right)$$

$$= \prod_{j=1}^{r}\left(\prod_{i\in I}\left[e(g,g)^{b^2 t\lambda_1\mu_j\left(\overline{ID}|H_j - ID_j\right)}\right]^{\frac{w_i}{|H_j| - ID_j}}\right)$$

$$= \prod_{j=1}^{r}\left(\prod_{i\in I} e(g,g)^{b^2 t\lambda_i \omega_i \mu_j}\right)$$

$$= \prod_{j=1}^{r} e(g,g)^{b^2 t\mu_j \sum_{i\in I}\lambda_i \omega_i}$$

$$= \prod_{j=1}^{r} e(g,g)^{b^2 t\mu_j s}$$

$$= e(g,g)^{b^2 st \sum_{j=1}^{r}\mu_j}$$

$$= e(g,g)^{b^2 st\mu}$$

V. Analysis and Evaluation of the Access Control System

A. Security Analysis

The security of embodiments of the invention can be concluded by the following Theorems.

Theorem 2. Suppose that the M-q-parallel-BDHE assumption holds. Then no PPT adversary can selectively break the DUR-CP-ABE scheme in accordance with the embodiments with a challenge access structure $(M^*, \rho^*)$, where the size of $M^*$ is $\ell^* \times n^*$ and $\ell^*, n^* \le q$.

Figure 2:
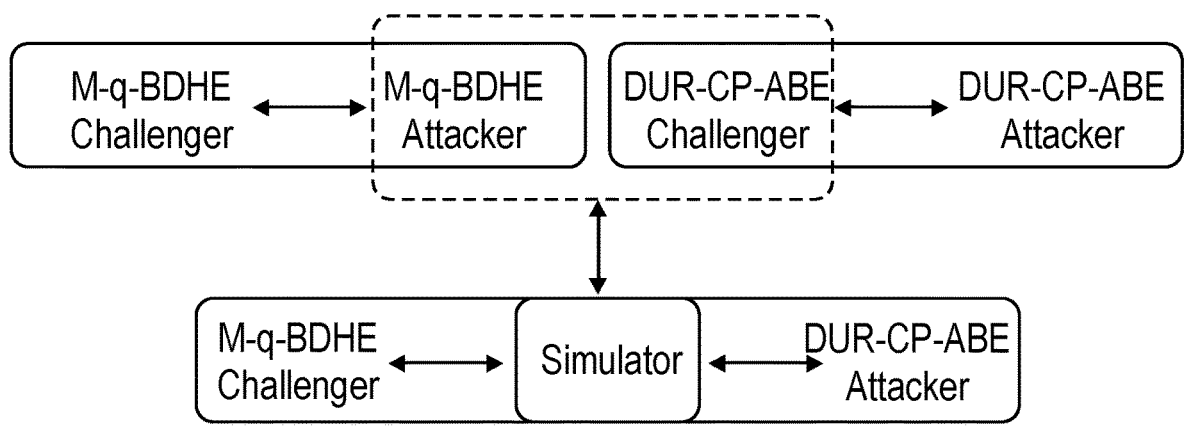
FIG. 2 illustrates the process of reduction to the M-q-BDHE problem in accordance with embodiments of the invention.

Proof Sketch: The basic idea of the proof of embodiments of the invention is using the reduction technology 200 as shown FIG. 2, where a simulator is constructed to simulate a DUR-CP-ABE game for the attacker by answering its queries and programming the challenge access structure together with the revoked identity set into the public parameters and the set of public attribute keys. The detailed proof is presented in Appendix A.

Theorem 3. The DUR-CP-ABE scheme is resistant against unauthorized access.

Proof. As discussed in the security model, there are two categories of unauthorized accesses: 1) one unauthorized user whose attributes do not satisfy the access policy or is revoked by the data owner; 2) two unauthorized colluding users.

The first category is stated directly in the two query constrains. For the second category, if the adversary A can query secret keys for two unauthorized users and use the two keys to get access to the encrypted message, the advantage will be non-negligible, which contradicts Theorem 1. A more intuitive way of proof is as follows. The key shares for both attributes and revoked identities are "personalized" to each user to prevent combination of decryption shares. In particular, each user's secret key is randomized by an exponent t such that when decrypting each user recovers shares $t\lambda_i\omega_i\mu_j$ where $\lambda_i\omega_i$ corresponds to the attributes and $\mu_j$ associates with the revoked user $ID_j$. Therefore, the secret keys of two users cannot work together to recover $ts\mu$ which is the key to successful decryption.

B. Performance Analysis

The following description analyzes the construction of embodiments of the invention in terms of computation, storage, and communication overhead. Since the embodiments are constructed based on the CP-ABE scheme by Waters denoted by W-CP-ABE, which itself and adapted constructions are broadly used, these embodiments serve as a baseline. To demonstrate how the size of the revoked identity set influences the overheads of the system, let "O-DUR-CP-ABE" denote the embodiment where r=1 and "M-DUR-CP-ABE" denote the embodiment where r>1.

In the following description, let m denote the number of attributes defined in the system; H is the number of layers in the organizational structure tree; r is the number of revoked identities; S indicates the set of attributes entitled to a user; l denotes the number of attributes involved in encryption; |I| is the number of attributes (subset of S used in decryption).

First the computation complexity is analyzed. There are four types of time-consuming operations in all the schemes, i.e. pairing, exponentiation, multiplication and inversion. The pairing and exponentiation operations take the dominant computation costs. Therefore, the number of pairing and exponentiation operations are used as metrics for computation complexity.

1) Computation Complexity Analysis: TABLE I and TABLE II present computation costs comparisons of the three schemes. In the Setup algorithm of all these three schemes, there is only one pairing operation that is brought by evaluating $e(g, g)^\alpha$. In W-CP-ABE, the number of exponentiations is m+3. In the other two schemes, there are mH+3 exponentiation operations because of the organizational structure. In the KeyGen algorithm of W-CP-ABE, the number of exponentiations is |S|+3. In the two DUR-CP-ABE schemes, according to embodiments of the invention, this number increases to H|S|+H'+3. The increment comes from the fact that all layers in a user's identity structure are embedded in the key component for each attribute.

For the Encrypt algorithm of W-CP-ABE, the number of exponentiation operations is 3l+2. In O-DUR-CP-ABE, the number is 2l+2. In M-DUR-CP-ABE, the number is (2l+1)r+2. In W-CP-ABE, the number of pairing needed for decryption is 2|I|+1, which is the same as that of O-DUR-CP-ABE. The number increases to 2|I|r+1 in M-DUR-CP-ABE. The number of exponentiations in W-CP-ABE, O-DUR-CP-ABE and M-DUR-CP-ABE is |I|, |I|, and |I|r. Increased overhead in M-DUR-CP-ABE is due to multiple user revocation.

2) Storage and Communication Overhead Analysis: The main storage overheads come from the Setup algorithm and KeyGen algorithm. The communication overheads come from the ciphertext generated by the encryption algorithm. TABLE III and TABLE IV summarize the storage and communication overhead of the three schemes.

TABLE I

Computation Complexity Comparison in terms of the Number of Pairing Operations

| Schemes | W-CP-ABE | O-DUR-CP-ABE | M-DUR-CP-ABE |
|---|---|---|---|
| Setup | 1 | 1 | 1 |
| KeyGen | 0 | 0 | 0 |
| Encrypt | 0 | 0 | 0 |
| Decrypt | 2|I| + 1 | 2|I| + 1 | 2|I|r + 1 |

TABLE II

Computation Complexity Comparison in terms
of the Number of Exponentiation Operations

| Schemes | W-CP-ABE | O-DUR-CP-ABE | M-DUR-CP-ABE |
|---|---|---|---|
| Setup | m + 3 | mH + 3 | mH + 3 |
| KeyGen | $|S|$ + 3 | H$|S|$ + H$^l$ + 3 | H$|S|$ + H$^l$ + 3 |
| Encrypt | 3l + 2 | 2l + 3 | (2l + 1)r + 2 |
| Decrypt | $|I|$ | $|I|$ | $|I|$r |

TABLE III

Storage Overhead Comparison

| Schemes | W-CP-ABE | O-DUR-CP-ABE | M-DUR-CP-ABE |
|---|---|---|---|
| Setup | m + 4 | Hm + 6 | Hm + 6 |
| KeyGen | $|S|$ + 2 | H $|S|$ + 3 | H$|S|$ + 3 |

TABLE IV

Communication Overhead Comparison

| Schemes | W-CP-ABE | O-DUR-CP-ABE | M-DUR-CP-ABE |
|---|---|---|---|
| Encrypt | 2l + 2 | 2l + 2 | 2lr + 2 |

The storage overhead in the Setup algorithm of W-CP-ABE is m+4. In the two DUR-CP-ABE schemes, it is mH+6 because of the public attribute keys generated for the organizational structure. In W-CP-ABE, the overhead of storing a private key is $|S|$+2. In the two DUR-CP-ABE schemes, the private key storage overhead increases to H$|S|$+3. The ciphertext size of W-CP-ABE, O-DUR-CP-ABE and M-DUR-CP-ABE is 2l+2, 2l+2, and 2lr+2 respectively.

C. Implementation and Testing Results

One embodiment of the invention was implemented in C using PBC library on Ubuntu 14.04 virtual machine with 1 GB RAM. All of the results were obtained by running the program ten times. To evaluate the relations between the number of attributes and the computation overhead, r is set to I and H to 2, i.e., only one identity is revoked and the height of the organizational tree is 3.

Figure 5:
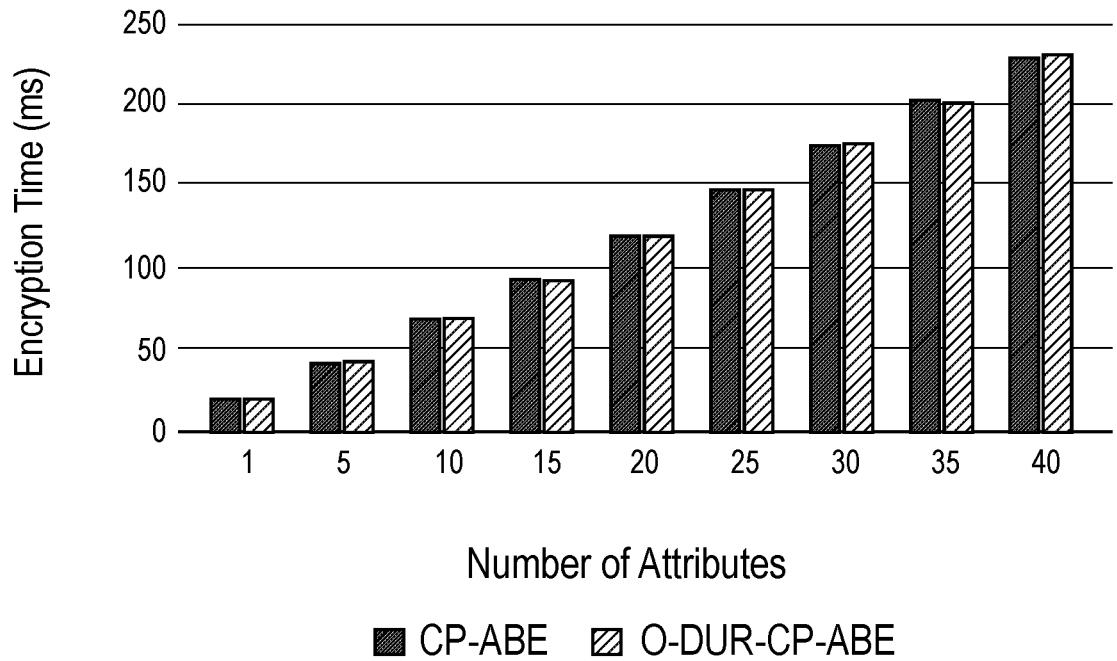
FIG. 5 graphically illustrates the encryption time consumption comparison of CP-ABE with embodiments of the invention (O-DUR-CP-ABE).
Figure 6:
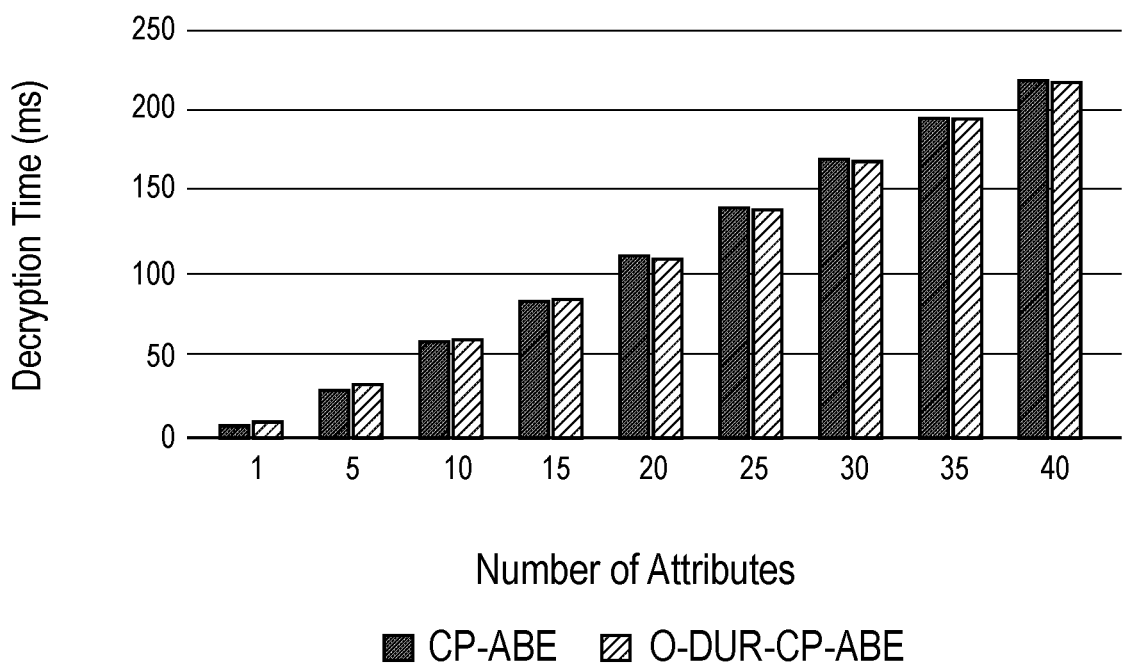
FIG. 6 graphically illustrates the decryption time consumption comparison of CP-ABE with embodiments of the invention (O-DUR-CP-ABE).

FIG. 5 and FIG. 6 show that the discretionary revocation does not increase the computation overhead on both the Data Owner end where encryption is performed (FIG. 5) and the User end where decryption is performed (FIG. 6).

Figure 3:
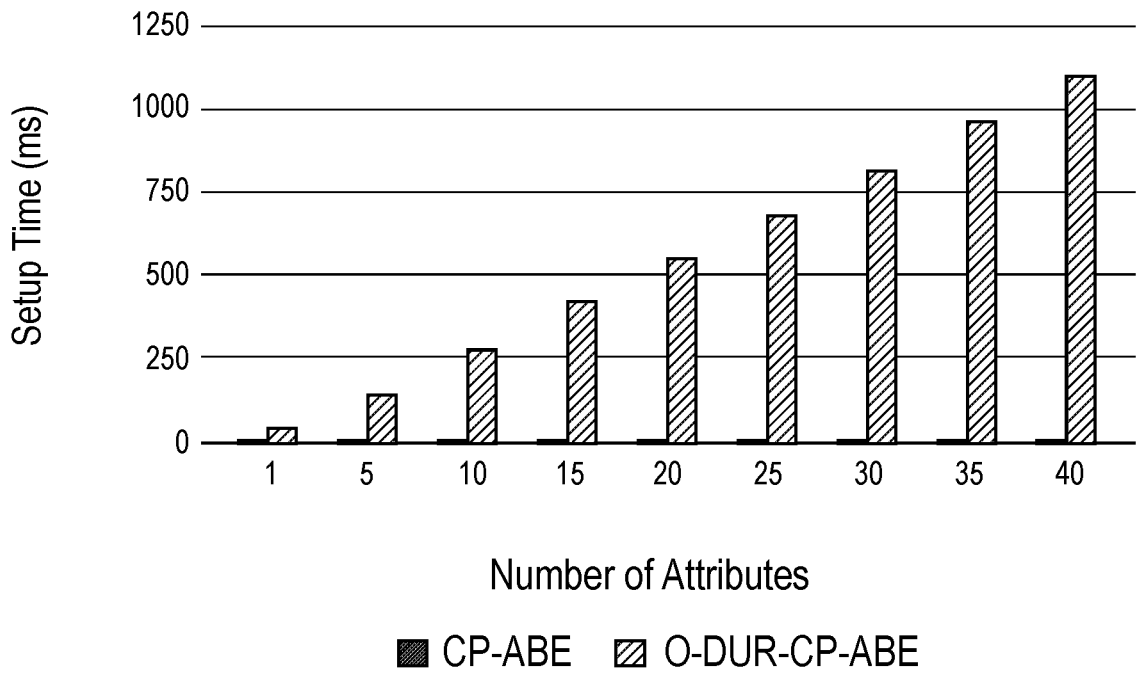
FIG. 3 graphically illustrates the setup time consumption comparison of CP-ABE with embodiments of the invention (O-DUR-CP-ABE).
Figure 4:
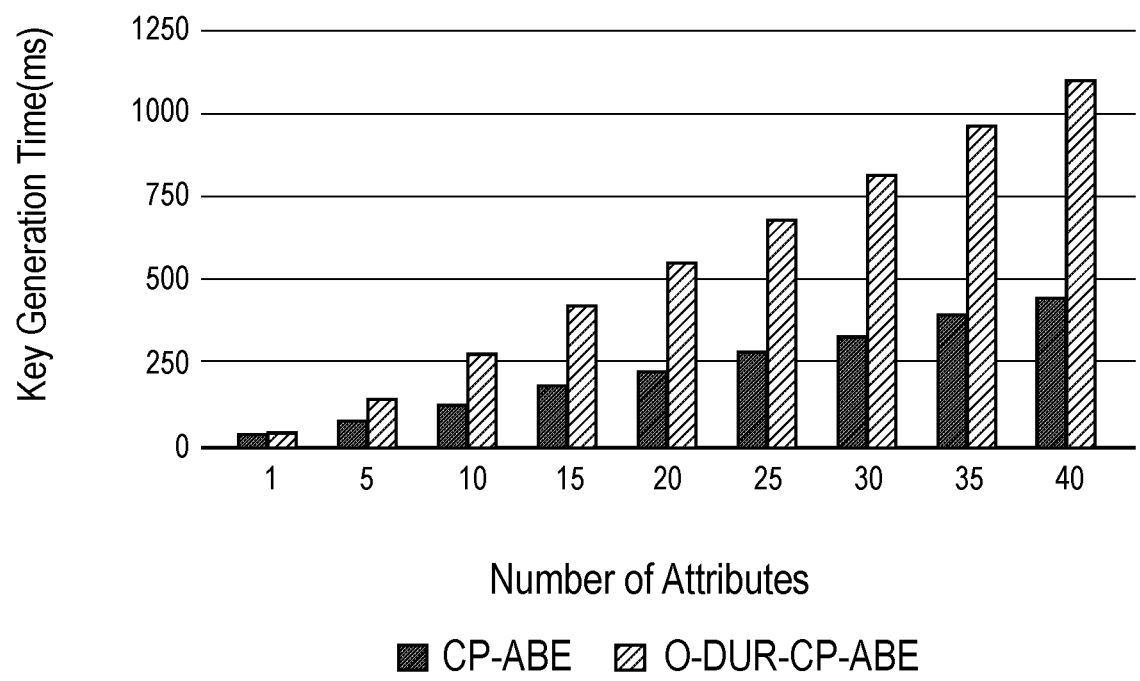
FIG. 4 graphically illustrates the key generation time consumption comparison of CP-ABE with embodiments of the invention (O-DUR-CP-ABE).

FIG. 4 demonstrates that when H is set to 2, the key generation overhead of O-DUR-CP-ABE is around two times the overhead of W-CP-ABE. H influences the added overhead, whereas in practice usually H≤10 (i.e., a small constant), thus the added overhead can be handled easily taking into consideration the increasing computing speed of enterprise servers. From FIG. 3, it is seen that O-DUR-CP-ABE will take a much longer time to initialize the system. The good news is the Setup algorithm will be run only once. Furthermore, compared with the attribute-based revocation solutions where the TA has to generate and distribute private updating information of revoked attributes for each data owner discretionary user revocation, this one-time overhead is dominantly more efficient.

Figure 7:
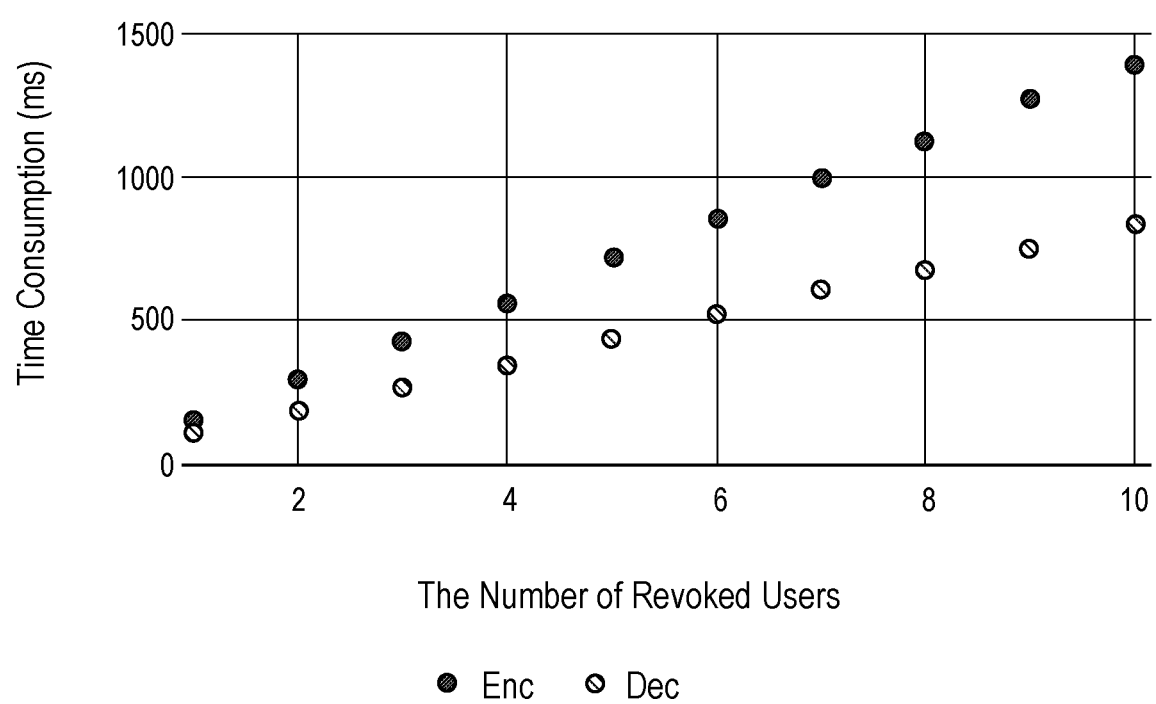
FIG. 7 illustrates the relations between the number of revoked identities and time consumption in M-DUR-CP-ABE in accordance with embodiments of the invention.

FIG. 7 shows that the computation complexity of the Encrypt and Decrypt algorithm is linear in r. DUR-CP-ABE, according to one embodiment, adds the broadcast encryption (BE) technique by Lewko and Sahai (LS for simplicity) conjunctively to a CP-ABE scheme. In LS, the size of public and private keys is a constant number and the public key allows data owners to encrypt an unbounded number of users, thus is efficient and scalable. Although there exists a BE system denoted by NNL with ciphertext size 0(log N)which is smaller than r when r=O(N), embodiments of the invention adopt LS because, first, the private key size of NNL is (O(log N))$^2$, and second, with ABE, the access structure has narrowed down the size of candidate authorized users to be much smaller than N, so in practice r is usually much smaller than log N, especially when affiliated user revocation is considered. To build a desired broadcast group, there exist tradeoffs between system scalability, key storage overhead and computation overhead. Considering the cloud storage application scenarios and the ever-increasing computing speeds, system scalability is much more important than computation overheads. Assume that users with a compromised key can be handled by attribute-based revocation, the data owner does not need to worry about these users, instead it just excludes few undesired ones in the group built with the access policy. Since the access policy has already narrowed down the target group, the number of revoked users will generally be small. Moreover, taking the affiliation-based revocation into consideration, in practice, the complexity could be further decreased.

VI. Related Work

Besides CP-ABE, there exists another form of Attribute-Based Encryption (ABE), i.e., Key-Policy ABE (KP-ABE), briefly mentioned above, where the decryption key is associated to the access control policy. Both ABE schemes have been used in enforcing fine-grained access control over cloud-stored data. Since CP-ABE enables data owners to define an access structure on attributes, it is considered to be more suitable for data access control in cloud storage.

As promising as it is, CP-ABE suffers from the user revocation problem. The prior art deals with the revocation problem with the key update approach. This approach is not well suited for discretionary user revocation. To this end, a new concept "direct revocation" mechanism with which the data owner sets the revocation list and somehow embeds it into the ciphertext was proposed. With CP-ABE, this can be done by using a non-monotonic ABE that supports negative clauses. With the user's identity being considered as a unique attribute in the system, to revoke a user, the data owner just needs to add the negation of the user's identity into the access structure. However, non-monotonic ABE will either bring about cumbersome attribute management and linear-size public key or have to use a weaker random oracle security model. Furthermore, treating an identity to be an attribute will make it lose structure information in IAM systems and impossible to perform affiliated revocation. Another approach to user revocation is broadcast ABE, presented in two schemes. Assume there are N users and r of them to be revoked. The first scheme is not scalable for cloud storage since N is predefined and the public parameter size is O(N). The second scheme does not have these limitations and has the same encryption/decryption complexity as embodiments of the invention. However, no formal security analysis and performance evaluation is provided. Moreover, both schemes do not fit in IAM systems, hence cannot perform affiliated revocation.

Attribute-based encryption provides a way to enforce data access control and data confidentiality, however in real-world applications, some mechanisms are needed to guarantee data quality. For example, the data receiver might get some encrypted messages from some rumor or fake news spreaders. Combining relationship information (i.e., graph connection information) among all the users in the system provides a way to detect all kinds of misinformation.

Figure 8:
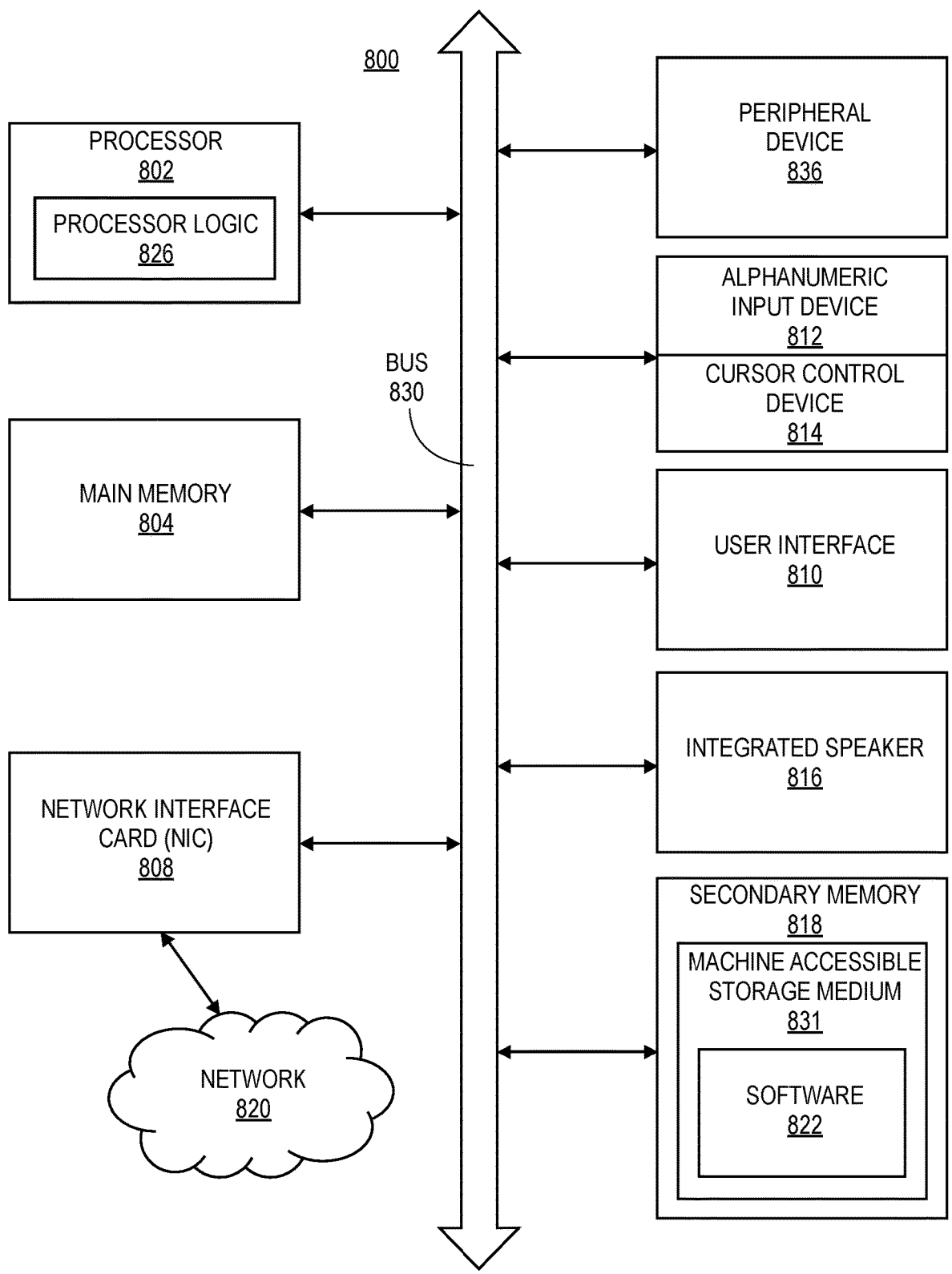
FIG. 8 illustrates a diagrammatic representation of a machine 800 in the exemplary form of a computer system, in accordance with one embodiment, within which a set of instructions, for causing the machine 800 to perform any one or more of the methodologies discussed herein, may be executed.

VII. Illustrative Computing Environment in Accordance with Certain Embodiments FIG. 8 illustrates a diagrammatic representation of a machine 800 in the exemplary form of a computer system, in accordance with one embodiment, within which a set of instructions, for causing the machine 800 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer to peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 818, which communicate with each other via a bus 830. Main memory 804 includes information and instructions and software program components necessary for performing and executing the functions with respect to the various embodiments of the systems, methods for implementing embodiments of the invention described herein. Instructions may be stored within main memory 804. Main memory 804 and its sub-elements are operable in conjunction with processing logic 826 and/or software 822 and processor 802 to perform the methodologies discussed herein.

Processor 802 represents one or more devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more devices such as an application specific integrated circuit (ASIC), a field programmable gate array (FPGA), a digital signal processor (DSP), network processor, or the like. Processor 802 is configured to execute the processing logic 826 for performing the operations and functionality which are discussed herein.

The computer system 800 may further include one or more network interface cards 808 to interface with the computer system 800 with one or more networks 820. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.). The computer system 800 may perform the functions of the embodiments as described herein.

The secondary memory 818 may include a non-transitory machine-readable storage medium (or more specifically a non-transitory machine-accessible storage medium) 831 on which is stored one or more sets of instructions (e.g., software 822) embodying any one or more of the methodologies or functions described herein. Software 822 may also reside, or alternatively reside within main memory 804, and may further reside completely or at least partially within the processor 802 during execution thereof by the computer system 800, the main memory 804 and the processor 802 also constituting machine-readable storage media. The software 822 may further be transmitted or received over a network 820 via the network interface card 808.

Some portions of this detailed description are presented in terms of algorithms and representations of operations on data within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system or computing platform, or similar electronic computing device(s), that manipulates and transforms data represented as physical (electronic) quantities within the computer system's registers and memories into other data similarly represented as physical quantities within the computer system memories or registers or other such information storage, transmission or display devices.

In addition to various hardware components depicted in the figures and described herein, embodiments further include various operations which are described below. The operations described in accordance with such embodiments may be performed by hardware components or may be embodied in machine-executable instructions, which may be used to cause a purpose processor programmed with the instructions to perform the operations. Alternatively, the operations may be performed by a combination of hardware and software, including software instructions that perform the operations described herein via memory and one or more processors of a computing platform.

Embodiments of invention also relate to apparatuses for performing the operations herein. Some apparatuses may be specially constructed for the required purposes, or selectively activated or configured by a computer program stored in one or more computers. Such a computer program may be stored in a computer readable storage medium, such as, but not limited to, any type of disk including optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms presented herein are not inherently related to any particular computer or other apparatus. In addition, embodiments of the invention are not described with reference to any particular programming language. It will be appreciated that a variety of programming languages may be used to implement the embodiments of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

APPENDIX A

SECURITY PROOF OF THEOREM 2

Because of limited space, the proof for DUR-CP-ABE is provided according to an embodiment of the invention with only one revoked identity. The proof for DUR-CP-ABE with multiple revoked identities, according to embodiments of the invention, can be obtained by adapting the following proof.

*Proof.* Init The simulator takes in an M-q-BDHE challenge $\{y, T\}$. Then the adversary declares the revoked identity $ID^*$ and gives the simulator the challenge access structure $\mathcal{A}^*$ that is described by the LSSS access structure $(M^*, \rho^*)$, where $M^*$ has $n^*$ (less than $q$) columns. Let the challenge matrix $M^* = (\overrightarrow{M_1^*}, \cdots, \overrightarrow{M_{l^*}^*})^T$, where each row vector $\overrightarrow{M_i^*} = (M_{i,1}^*, \cdots, M_{i,n^*}^*)$ for $1 \leq i \leq l^*$.

Setup The simulator chooses a random value $\alpha'$ and lets $e(g,g)^\alpha = e(g,g)^{\alpha'} e(g^a, g^{a^q})$ to implicitly set $\alpha = \alpha' + a^{q+1}$. Moreover, let $g^b = g^a$, $g^{b^2} = (g^{a^2})$ to implicitly set $b = a$.

To embed $ID^*$ and $(M^*, \rho^*)$ in $\{h_{xi}^b\}_{x \in U, i \in [1, H]}$, we regard the challenge matrix $M^*$ as a row vector set and divide it into three subsets $M^{*\prime}$, $M^{*\prime\prime}$ and $M^{*\prime\prime\prime}$ such that $M^{*\prime} \cup M^{*\prime\prime} \cup M^{*\prime\prime\prime} = M^*$ and $M^{*\prime} \cap M^{*\prime\prime} \cap M^{*\prime\prime\prime} = \emptyset$. Specifically, $M^{*\prime}$, $M^{*\prime\prime}$ and $M^{*\prime\prime\prime}$ are initially set to be empty set. Define the $n$-dimension vectors $\overrightarrow{z} = (1, 0, \ldots, 0)$ and $\overrightarrow{v} = (a^2, a^3, \ldots, a^{n-1})$. For $i = 1$ to $l^*$, if $\overrightarrow{M_i^*}$ is linearly independent on $M^{*\prime}$ and $\overrightarrow{z}$ cannot be linearly expressed by $M^{*\prime} \cup \{\overrightarrow{M_i^*}\}$, then we merge $\overrightarrow{M_i^*}$ into $M^{*\prime}$; if $\overrightarrow{M_i^*}$ is linearly independent on $M^{*\prime}$ and $\overrightarrow{z}$ can be linearly expressed by $M^{*\prime} \cup \{\overrightarrow{M_i^*}\}$, then we merge $\overrightarrow{M_i^*}$ into $M^{*\prime\prime\prime}$; if $\overrightarrow{M_i^*}$ is linearly dependent on $M^{*\prime}$, then we merge $\overrightarrow{M_i^*}$ into $M^{*\prime\prime}$. As a result, $M^{*\prime}$ is a linear independent vector group while each vector in $M^{*\prime\prime}$ can be linearly expressed by $M^{*\prime}$. Although $\overrightarrow{z}$ cannot be spanned by $M^{*\prime}$, it can be linearly expressed by $M^{*\prime}$ merged with each vector in $M^{*\prime\prime\prime}$. Therefore, each vector in $M$ can be linearly expressed by $M^{*\prime} \cup \{\overrightarrow{z}\}$.

Next, we describe how the simulator "programs" $\{h_{xi}^b\}_{x \in U, i \in [1, H]}$. X denotes the set of indices $i$ so that $\rho^*(i) = x$. Assume there are $m$ vectors in $M^{*\prime}$ and $M^{*\prime} = (\overrightarrow{M_1^*}, \cdots, \overrightarrow{M_m^*})^T$. For $i \in X$, its row vector $\overrightarrow{M_i^*}$ can be written as $c_{i0} \overrightarrow{z} + c_{i1} \overrightarrow{M_1^*} + \cdots + c_{im} \overrightarrow{M_m^*}$, where $(c_{i0}, c_{i1}, \cdots, c_{im}) \in Z_p^m$. For each $\overrightarrow{M_i^*}$, define a vector $\overrightarrow{M_i^{}}$, where $\overrightarrow{M_i^{}} = c_{i1} \overrightarrow{M_1^*} + \cdots + c_{im} \overrightarrow{M_m^*}$. As a result, we get a new vector group $M^{} = (\overrightarrow{M_1^{}}, \cdots, \overrightarrow{M_{l^*}^{}})$ and each $\overrightarrow{M_i^{}}$ is in the span of $M^{*\prime}$. By choosing a random value $z_{xi}$, the simulator programs $h_{xi}$ and $h_{xi}^b$ as follows:

$$h_{xh} = g^{z_{xh}} g^{-aID_{ih}^*} \prod_{i \in X} g^{(c_{i1}\overrightarrow{M_1^*} + \cdots + c_{im}\overrightarrow{M_m^*}) \cdot \overrightarrow{v}/b_i}$$

$$h_{xh}^b = g^{z_{xh}} g^{-a^2 ID_{ih}^*} (\prod_{i \in X} \prod_{j=1}^n g^{M_{i,j}^* a^{j+1}/b_i}).$$

If $X$ is an empty set, we set $h_{xh}^b = g^{z_{xh}}$. Then the simulator publishes the above parameters $(g, g^b, g^{b^2}, \{h_{xh}^b\}_{x \in U, h \in [1, H]}, e(g, g)^\alpha)$ as the public parameters.

Phase I For a query $(S, ID)$, the simulator constructs the private key as follows. Since each $\overrightarrow{M_i^{**}}$ is in the span of $M^{*\prime}$ while $\overrightarrow{z}$ is not in the span of $M^{*\prime}$, we can still find a vector $\overrightarrow{w}$ with $\omega_1 = -1$ and $\overrightarrow{w} \cdot \overrightarrow{M_i^{**}} = 0$, where $1 \leq i \leq m$.

Therefore, the simulator selects a random value $r$ and calculates the private key $L$ as $$L = g^{r - \overrightarrow{w} \cdot \overrightarrow{v}} = g^r \prod_{i=1,\cdots,n^*} (g^{a^{q-i}})^{-\omega_i},$$

which implicitly sets the randomness $t$ as $$t = r - \overrightarrow{w} \cdot \overrightarrow{v} = r + \omega_1 a^{q-1} + \omega_2 a^{q-2} + \cdots + \omega_{n^*} a^{q-n^*},$$

where $\overrightarrow{v} = (a^{q-1}, a^{q-2}, \cdots, a^{q-n^*+2})$. Since $g^{a^2 t}$ contains a term of $g^{-a^{q+1}}$ we can cancel out the unknown term in $g^\alpha$ when creating the $K$ component in the private key. The simulator constructs $K$ as follows.

$$K = g^{\alpha'} g^{a^2 r} \prod_{i=0,\cdots,n^*-2} (g^{a^{q+i}})^{-\omega_i}.$$

For $\forall x \in S$, if there is no $i$ such that $\rho^*(i) = x$, the simulator simply sets $K_{xh} = L^{z_{xh}}$. For those used in the challenge access structure, we must make sure that there are no terms of the form $g^{a^{q+1}/b_i}$ that the simulator cannot simulate. Since $\overrightarrow{w} \cdot M_i^{*\prime} = 0$, all of these terms can be canceled. Define $X$ as the set of all $i$ such that $\rho^*(i) = x$, the simulator creates $K_{xh}$ as follows.

$$K_{xh} = (g^{z_{xh}} g^{a(ID_h - ID_h^*)} \prod_{i \in X} g^{\overrightarrow{M_i^{**}} \cdot \overrightarrow{v}/b_i})^{(r + \overrightarrow{w} \cdot \overrightarrow{v})}$$

Challenge In this phase, the adversary provides to the simulator two challenge messages $\mathcal{M}_0$, $\mathcal{M}_1$ with the challenge matrix $M$ of dimension at most $n^*$ columns. First, The simulator flips a coin $\beta$ and creates the ciphertext component $C = \mathcal{M}_\beta T \cdot e(g^s, g^{\alpha'})$, $C' = g^s$. Then the simulator chooses random value $y_2', \cdots, y_n'$ and share the secret $s$ using the vector $$\overrightarrow{v} = (s, y_2', y_3', \ldots, y_n').$$

Next the simulator calculates $$\lambda_k = \overrightarrow{v} \cdot (c_{k0} \overrightarrow{z} + c_{k1} \overrightarrow{M_1^*} + c_{k2} \overrightarrow{M_2^*} + \ldots + c_{km} \overrightarrow{M_m^*})$$

And it generates the ciphertext component $C_k^*$ as:

$$\hat{C}_k = g^{as(M_{k,1}^* + z_{k0})} \cdot \prod_{i=2}^n g^{M_{k,i}^* y_i'}$$

For $k = 1, \cdots, n^*$, we define $X_k$ as the set of the index $i$ in such that $\rho(i) = \rho(k)$. Finally, the simulator builds the ciphertext component $C_k'$ as:

$$C_k' = (g^{a^2 ID^*} g^{z_{xh}} g^{-a^2 ID^*} \prod_{i \in X_k} g^{\overrightarrow{M_i^{**}} \cdot \overrightarrow{v}/b_i})^{\lambda_k}$$

Phase II Same as phase I.

Guess The adversary will eventually output a guess $\beta'$ of $\beta$. The simulator then outputs 0 to guess that $T = e(g,g)^{sa^{q+1}}$ if $\beta' = \beta$; otherwise, it outputs 1 to indicate that it believes $T$ is a random group element in $G_T$. When $T$ is a tuple the simulator $\mathcal{B}$ gives a perfect simulation so we have that $$Pr[\mathcal{B}(\overrightarrow{X}, T = e(g,g)^{sa^{q+1}}) = 0] = \frac{1}{2} + Adv_\mathcal{A}.$$

When $T$ is a random group element, the message $\mathcal{M}_\beta$ is completely hidden from the adversary and we have $Pr[\mathcal{B}(\overrightarrow{X}, T = R) = 0] = \frac{1}{2}$. Therefore, $\mathcal{B}$ can play the modified decisional $q$-parallels $BDHE$ game with non-negligible advantage.

What is claimed is:

1. A method for a data owner to enforce attribute-based and discretionary access control to a cloud-based data store, the method comprising:
specifying an access policy;
creating a plurality of users with attributes that satisfy the access policy;
revoking one or more of the plurality of users by embedding their respective identities as revoked into a ciphertext;
allowing only those of the plurality of users whose attributes satisfy the access policy and that are not revoked to decrypt the ciphertext;
encrypting data under a set of access policies including the specified access policy;
wherein revoking one or more of the plurality of users by embedding their respective identities as revoked into a ciphertext comprises:
creating a set of revoked user identities;
transmitting the set of access policies and the set of revoked user identities to a cloud server operated by a cloud-storage service provider;
encrypting a data encrypting key (DEK), wherein the DEK is a symmetric data encryption key K, using an Attribute-Based Encryption (ABE) scheme;
encrypting data using the DEK with a symmetric encryption scheme, thereby creating a symmetric encryption ciphertext of data M; and
transmitting an ABE ciphertext of K and the symmetric encryption ciphertext of the data M to the cloud-storage service provider for storage.

2. The method of claim 1, wherein the one or more of the plurality of users are one of:
individual users and affiliated users.

3. Non-transitory computer readable storage media having instructions stored thereon that, when executed by a processor of a system, the instructions cause the system to perform operations for a data owner to enforce attribute-based and discretionary access control to a cloud-based data store, comprising:
specifying an access policy;
creating a plurality of users with attributes that satisfy the access policy;
revoking one or more of the plurality of users by embedding their respective identities as revoked into a ciphertext;
allowing only those of the plurality of users whose attributes satisfy the access policy and that are not revoked to decrypt the ciphertext;
encrypting data under a set of access policies including the specified access policy;
wherein revoking one or more of the plurality of users by embedding their respective identities as revoked into a ciphertext comprises:
creating a set of revoked user identities;
transmitting the set of access policies and the set of revoked user identities to a cloud server operated by a cloud-storage service provider;
encrypting a data encrypting key (DEK), wherein the DEK is a symmetric data encryption key K, using an Attribute-Based Encryption (ABE) scheme;
encrypting data using the DEK with a symmetric encryption scheme, thereby creating a symmetric encryption ciphertext of data M; and
transmitting an ABE ciphertext of K and the symmetric encryption ciphertext of the data M to the cloud-storage service provider for storage.

4. The non-transitory computer readable storage media of claim 3, wherein the one or more of the plurality of users are one of: individual users and affiliated users.

5. An apparatus for access control of data stored in a cloud server, comprising:
a memory to store instructions for carrying out one or more algorithms;
a processor to execute the instructions stored within the memory;
a setup algorithm executed by a trusted authority (TA) that takes as inputs a security parameter $\lambda$ and an attribute universe U and outputs a master secret key MSK, public parameters PP, and a set of attribute-related public keys $\{PK_x\}$;
a key generation algorithm executed by the TA that takes as inputs the master secret key MSK, a user's hierarchically structured identity ID, and a set of attributes S that describe the user's access privilege, and provides as outputs a secret key SK for the user;
a data encryption algorithm executed by a data owner that takes as inputs the public parameters PP, the public attribute keys $\{PK_x\}$, a message M, a set of IDs of revoked identities, and an access policy A, and provides as outputs a ciphertext CT; and
a data decryption algorithm executed by the user that takes as inputs the ciphertext CT downloaded from the cloud server, and the secret key SK, and provides as outputs a message M when the attributes associated with a secret key holder satisfy A and the user's ID is not in the set of IDs of revoked identities.

6. The apparatus of claim 5, wherein a revoked identity in the set IDs comprises an identity of one of: an individual user, and a subordinate organization in an organizational structure.

7. The apparatus of claim 5, wherein the ciphertext CT is associated with an access policy A and a set of revoked identities denoted by the IDs.

8. The apparatus of claim 5, wherein the setup algorithm executed by the trusted authority (TA) that outputs a master secret key MSK comprises the setup algorithm selecting a plurality of random exponents $\alpha, b \in Z_p$ as the master secret key MSK=$\{\alpha, b\}$.

9. The apparatus of claim 8, wherein the setup algorithm executed by the trusted authority (TA) that outputs public parameters PP comprises the setup algorithm generating public parameters as PP=$(g, g^b, g^{b^2}, e(g, g)^\alpha)$, wherein a term G represents a bilinear group of prime order p, and further wherein the term g is a generator for the term G.

10. A method for access control of data stored in a cloud server, comprising:
storing instructions for carrying out one or more algorithms in a data store;
executing the instructions stored within the data store via a processor;
executing a setup algorithm by a trusted authority (TA) that takes as inputs a security parameter $\lambda$ and an attribute universe U and outputs a master secret key MSK, public parameters PP, and a set of attribute-related public keys $\{PK_x\}$;
executing a key generation algorithm by the TA that takes as inputs the master secret key MSK, a user's hierarchically structured identity ID, and a set of attributes S that describe the user's access privilege, and provides as outputs a secret key SK for the user;
executing a data encryption algorithm by a data owner that takes as inputs the public parameters PP, the public attribute keys $\{PK_x\}$, a message M, a set of IDs of revoked identities, and an access policy A, and provides as outputs a ciphertext CT; and executing a data decryption algorithm by the user that takes as inputs the ciphertext CT downloaded from the cloud server, and the secret key SK, and provides as outputs a message M when the attributes associated with a secret key holder satisfy A and the user's ID is not in the set of IDs of revoked identities.

11. The method of claim 10, wherein a revoked identity in the set IDs comprises an identity of one of: an individual user, and a subordinate organization in an organizational structure.

12. The method of claim 10, wherein the ciphertext CT is associated with an access policy A and a set of revoked identities denoted by the IDs.

13. The method of claim 10, wherein executing the setup algorithm by the trusted authority (TA) that outputs a master secret key MSK comprises selecting via the setup algorithm a plurality of random exponents $\alpha, b \in Z_p$ as the master secret key MSK=$\{\alpha, b\}$.

14. The method of claim 13, wherein executing the setup algorithm by the trusted authority (TA) that outputs public parameters PP comprises generating public parameters as PP=$(g, g^b, g^{b2}, e(g, g)^\alpha)$, wherein a term G represents a bilinear group of prime order p, and further wherein the term g is a generator for the term G.

\* \* \* \* \*